Sept. 7, 1954
C. B. WEEDON
2,688,387
WINDOW SEALING CONSTRUCTION
Filed June 15, 1950
4 Sheets-Sheet 1
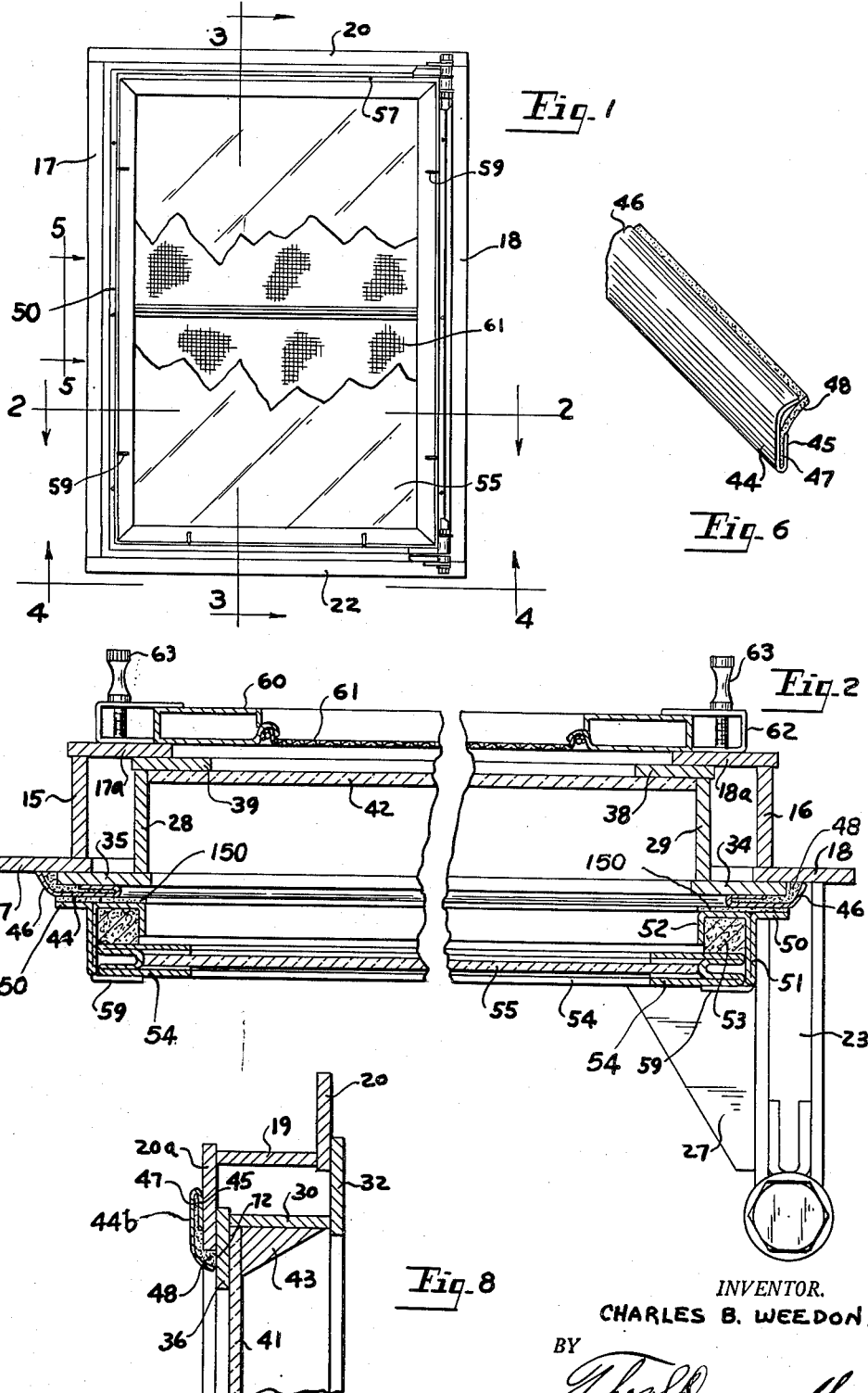
INVENTOR.
CHARLES B. WEEDON.
BY Thos. S. Donnelly
ATTORNEY.

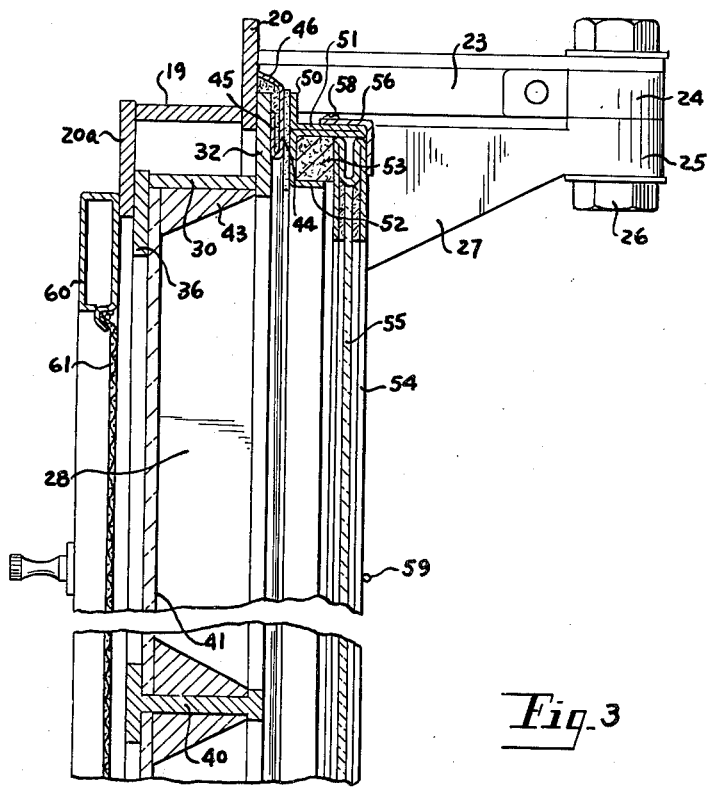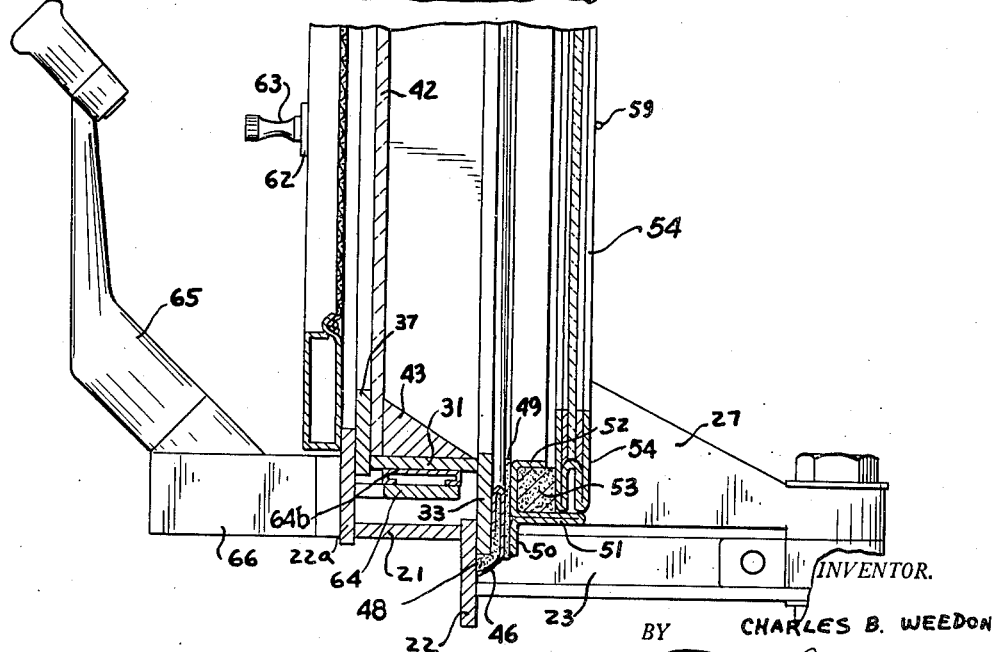

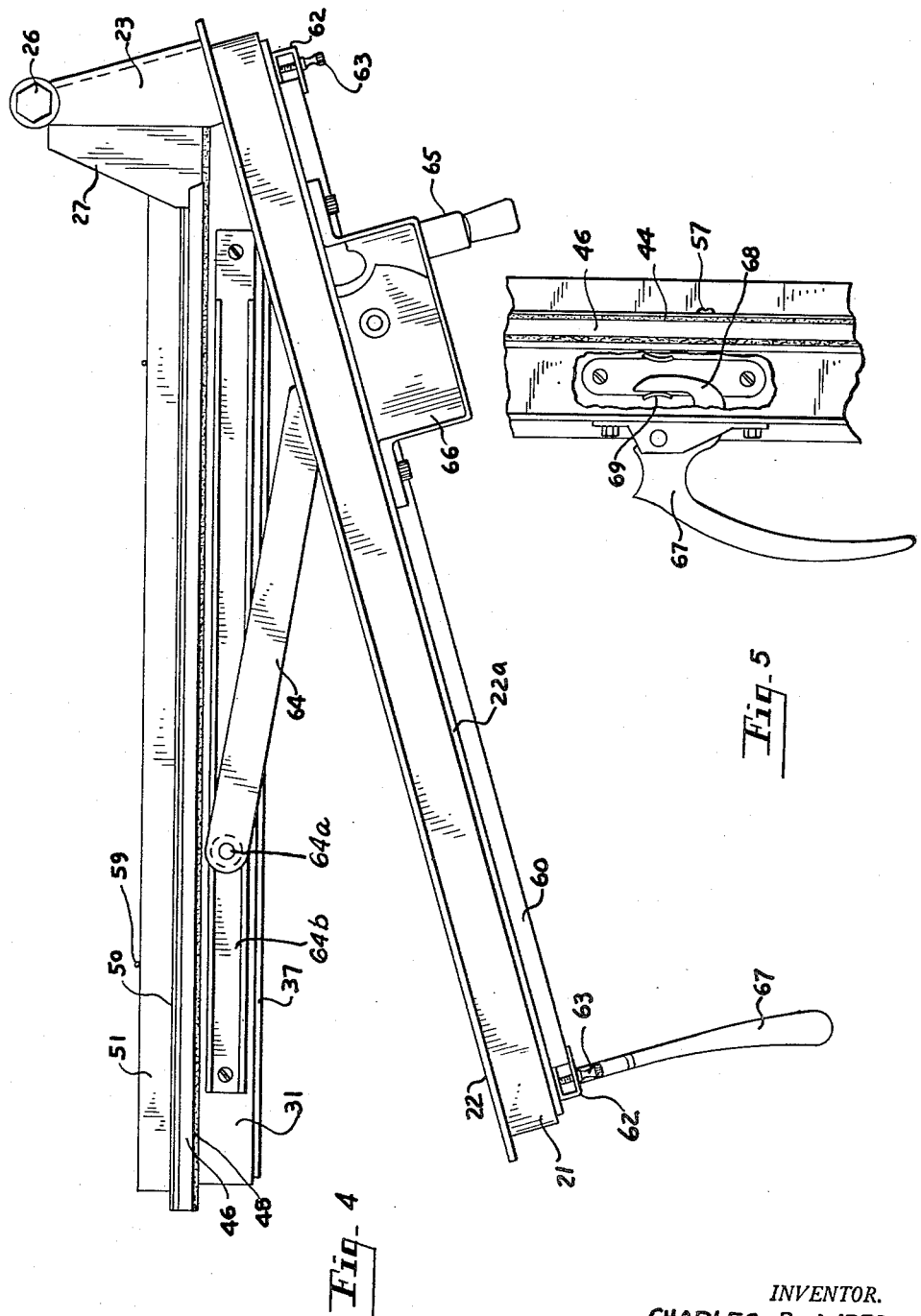

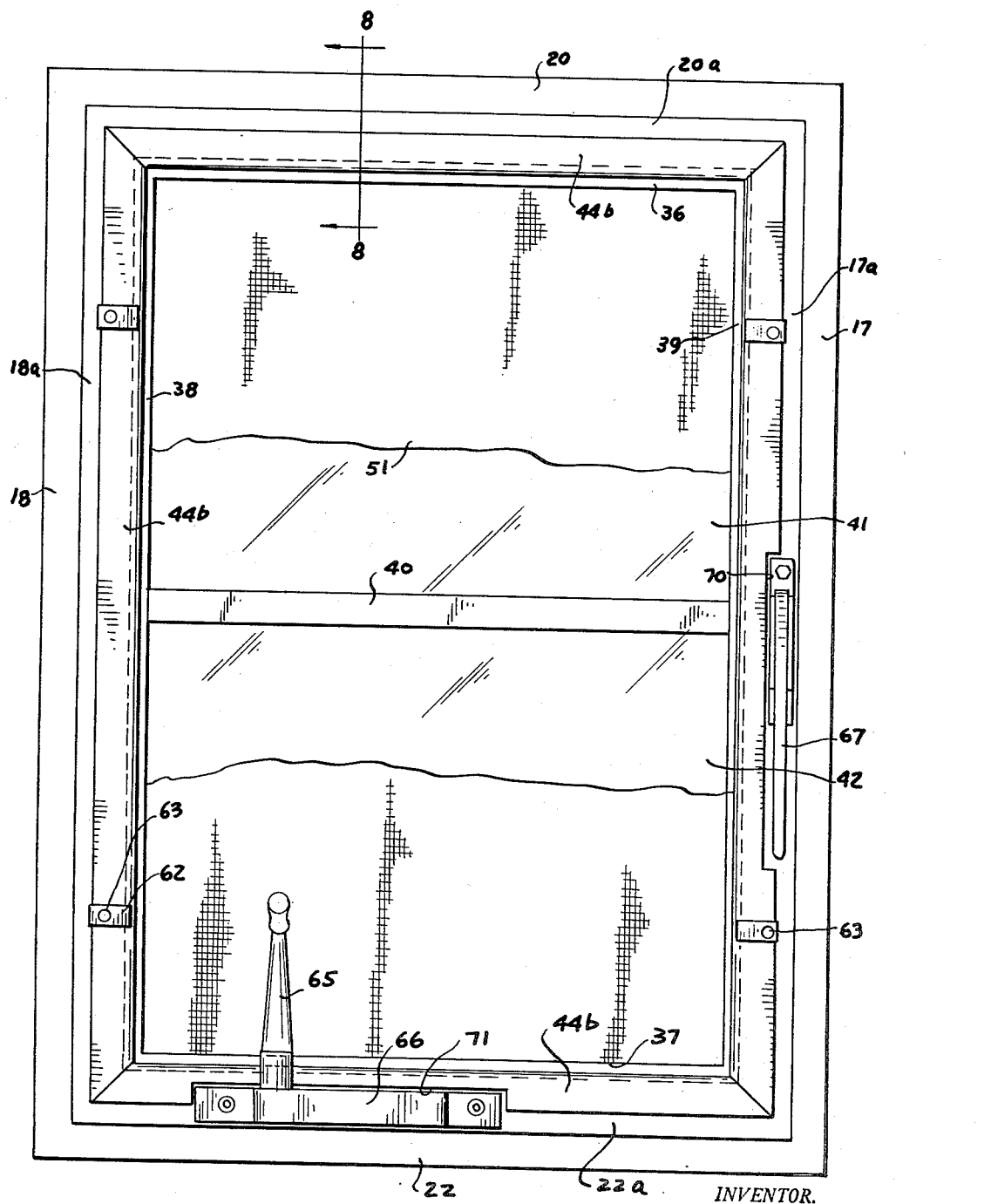

Patented Sept. 7, 1954

2,688,387

UNITED STATES PATENT OFFICE 2,688,387

WINDOW SEALING CONSTRUCTION

Charles B. Weedon, Pontiac, Mich.

Application June 15, 1950, Serial No. 168,179

1 Claim. (Cl. 189—65)

My invention relates to a new and useful improvement in a window sealing construction adapted for use in sealing around the windows to prevent entry of air through or around the window. The invention is admirably adapted for use on windows which are swingably mounted and particularly is it useful for use on storm windows.

It is an object of the present invention to provide a sealing constructon so arranged that when the window is moved to closed position the sealing strip wil be automatically compressed so as to prevent passage of air around the window.

Another object of the invention is the provision of a sealing strip which may be mounted on the window itself to engage a casing or which may be mounted on the casing to engage the window so that when the window is moved to closed position the sealing desired will be effected.

Another object of the invention is to provide a sealing construction embodying a sealing strip having a retainer formed from metal or other rigid material and provided with a sealing strip of felt, rubber or the like which is free at one end and normally spaced from one edge of the retainer and which when in sealing position will be in close engagement with the retainer.

Another object is the provision of a sealing strip mounted on a retainer having a free edge and having the retainer so shaped that a space is provided with the retainer into which the sealing strip may be forced when the window on which it is mounted is moved to closed position.

Other objects will appear hereinafter.

It is recognized that various modifications and changes may be made in the detail of structure illustrated without departing from the invention and the present disclosure is to be considered the preferred embodiment.

Forming a part of this specification are drawings, in which,

Fig. 1 is an elevational view of a window with the invention applied,

Fig. 2 is a sectional view taken on line 2—2 of Fig. 1, slightly enlarged with parts broken away, Fig. 3 is a slightly enlarged sectional view taken on line 3—3 of Fig. 1 with parts broken away, Fig. 4 is a top plan view of a window partly open and showing the invention applied, Fig. 5 is a fragmentary sectional view slightly enlarged showing the locking mechanism used on the window, Fig. 6 is a perspective of a fragment of the sealing strip, Fig. 7 is an elevational view from the inside of a window showing a modified form of the invention applied with parts broken away, Fig. 8 is a fragmentary sectional view taken on line 8—8 of Fig. 7.

In the drawings I have illustrated the invention used with the window construction embodying a frame having the oppositely disposed vertically extending side rails 15 and 16, as shown in Fig. 2. Secured to the side rail 15 and projecting outwardly therefrom is the plate or flange 17 and a similar flange 18 projects outwardly from the side rail 16. Connecting these side rails at their upper ends is a top rail 19 secured to and projecting upwardly from which is the flange or plate 20, as shown in Fig. 3. Connecting these vertically extending rails together at their bottom is a bottom rail 21 secured to which and projecting downwardly from which is a flange or plate 22. Secured to the rail 19 at its inner side and projecting downwardly therefrom and connecting the side rails 15 and 16 is a flange or plate 28 and a similar flange or plate 22a is secured to and projects upwardly from the bottom rail 21.

Secured to the outer side of the flange or plate 20 and also to the plate 22 is a supporting arm 23 formed on which is a knuckle 24 which cooperates with the knuckle 25 and through which extends a bolt 26. The knuckle 25 is formed on the supporting arm 27 so that a hinge is thus provided.

A window frame is provided which embodies the upwardly directed side rails 28 and 29, as shown in Fig. 2, which are connected together at their upper ends by the top rail 30 and the bottom rail 31, as shown in Fig. 8 and Fig. 3. Secured to the top rail 30 and extending upwardly therefrom is a plate 32 which, when the window is closed is adapted to engage against the face of the plate 20 as shown in Fig. 8. Secured to the bottom 31 and projecting downwardly therefrom is a plate 33 which, when the window is moved to closed position is adapted to engage against the face of the plate 22 as shown in Fig. 3. Secured to the rails 28 and 29 and extending vertically the length of these plates 28 and 29 and projecting inwardly therefrom are the flanges or plates 38 and 29 as shown in Fig. 2. When the window is moved to closed position these plates 38 and 39 engage the faces of the flanges or plates 17a and 18a. Extending between and connecting the side rails 28 and 29 intermediate their ends is a bar 40 so as to divide the window sash into an upper and lower section. Positioned in the upper section is a pane 41 of glass and a pane 42 of glass is positioned in the lower section as shown in Fig. 3. Putty 43 is used to engage the glass panes in the usual manner.

A sealing strip is used comprising a rigid and preferably metallic U-shaped retaining strip having a short leg 45 and a longer leg 44 clamping one end of a yieldable material 47. This member 47 may be made from felt, rubber, leather, or the like. The opposite edge 48, as shown in Fig. 6, is free and is extended beyond the angularly turned edge 46 of the leg 44. The relative position of the parts shown in Fig. 6 is that position which they occupy when the window is open so that there is thus a space at the free portion of the strip 48 between this sealing material and curved portion 46. Secured to the outer face of the members 34 and 35 and 32 and 33 is a metallic frame embodying the frame 50 which bears against the sealing frame 150 positioned to engage the U-shaped member as shown in Fig. 2. This member 50 is secured to the members on which attached by means of screws or the like which are projected through the member 50 and through the legs 44 and 45. The frame 50 is provided with the doubled over portion 51 which carries the channel 52 at its inner edge to provide a space in which a sealing strip 53 is positioned. Positioned to engage this sealing strip 53 is a frame 54 of a storm window in which is mounted a pane of glass 55. An L-shaped strip 56 is mounted at the top of the member 51 by means of a screw 58 and extended downwardly so as to engage the outer face of the frame 54 and retain it in position.

Mounted in the vertically extended portions 56 of the L-shaped frame are L-shaped keepers 59 which may be turned to engage the outer face of the frame 54 and serve as additional means for retaining same in position.

Mounted on the inner face of the member 18a and 17a are keepers 62 which may be rotated on the screw 63 and which may be held in fixed position by the screw 63 in clamping relation to the frame 60 in which is mounted a screen 61, as shown in Fig. 2 and Fig. 3.

An actuating arm 64 extends at one end into a gear housing 66 which is provided with a crank 65 to actuate the gears and swing the arm 64, this arm 64 being provided with a bolt 64a which slides in the channel member 64b mounted on the bottom rail 31, so that when the crank 65 is turned the frame which carries the glass may be swung inwardly and outwardly of the stationary frame.

Mounted on the rail 17a of the stationary frame is blocking handle 67 having the nose 68 adapted to engage the clip 69 on the swingable frame so as to securely retain the swingable frame in closed position.

The construction is such that when the swingable frame is swung to open position the free edge of the sealing strip 48 will assume the position shown in Fig. 6. When swung into closed position this free edge will assume the position shown in Fig. 2 and in Fig. 3. Due to the fact that the free edge 48 extends beyond the curved edge 46 of the leg 44 the free edge 48 is forced into a bunched formation as clearly shown in Fig. 2, this bunched formation resulting from the pressure exerted on the free edge 48 by the faces of the members 17, 18, 20 and 22. This engagement of the free edge 48 with these faces is such that an effective sealing is obtained and passage of air inwardly around the inner sides of the members 17 and 18 and 22 and 23 is prevented.

In Fig. 7 and Fig. 8, I have shown a slightly different application of the invention described. In this application I have mounted the U-shaped member on the inner faces of the members 17a, 18a, 20a and 22a with the free edge 48 of the compressible sealing member extended beyond the end of the longer leg 44b so that when the swingable window is swung to closed position the free edge 48 of the compressible sealing member will engage the inner face of the members 38 and 39 and 36 and 37 to effect the sealing as shown in Fig. 8. In this construction the bunching of the sealing edge 48 will be effected as already described and as clearly shown in Fig. 8.

In this way I have provided a sealing construction which serves to engage the face of the rails of the frame, whether the frame be the frame of the sashes or the stationary frame relative to which the sash frames are moved. This sealing engagement is continuous and extends around the entire window and as shown in Fig. 7 the U-shaped member is cut away at 70 to clear the handle 67 and also cut away as at 71 to clear the gear housing 66.

Experience has shown that a sealing construction of this class is highly efficient in use, while at the same time it may be economically manufactured and easily and quickly installed on windows.

What I claim is:

A window sealing construction of the class described, comprising: a window sash frame provided with a top rail and oppositely disposed side rails and a bottom rail, and a window frame having oppositely disposed side rails, a top rail and a bottom rail, said window sash frame being swingably mounted on said window frame and swingable into open and closed position; a retaining strip mounted on one of said frames and doubled upon itself at one edge to provide a pair of legs, one leg being longer than the other; a sealing strip positioned at one edge between said legs and clamped therein and free at its opposite edge and extending beyond the end edge of said longer leg, said longer leg being angularly turned adjacent its marginal portion to overlie said shorter leg and, when said sash frame is swung to open position, engaging at its end edge the surface of said sealing strip inwardly from its free end and retaining said sealing strip, except at said line of engagement therewith, in spaced relation to said longer leg at that portion which projects beyond said shorter leg, said sealing strip engaging at its free edge with one of said frames upon swinging of the sash frame into closing position, the portion of said sealing strip between the edge of said shorter leg and said line of engagement, engaging upon swinging of said sash frame into closing position, against one face of said longer leg throughout the area thereof.

References Cited in the file of this patent

UNITED STATES PATENTS

| Number | Name | Date |
| --- | --- | --- |
| 1,270,151 | Harnly | June 18, 1918 |
| 1,904,491 | Manhan | Apr. 18, 1933 |
| 2,002,569 | Dennis | May 28, 1935 |
| 2,101,803 | Ames | Dec. 7, 1937 |
| 2,105,164 | Schlegel | Jan. 11, 1938 |

FOREIGN PATENTS

| Number | Country | Date |
| --- | --- | --- |
| 599,939 | Great Britain | Mar. 24, 1948 |